Nov. 19, 1957 S. E. BENDER ET AL 2,813,799
METHODS AND MEANS FOR MANUFACTURING
INDIVIDUAL CONDIMENT DISPENSERS
Filed March 7, 1956 3 Sheets-Sheet 3
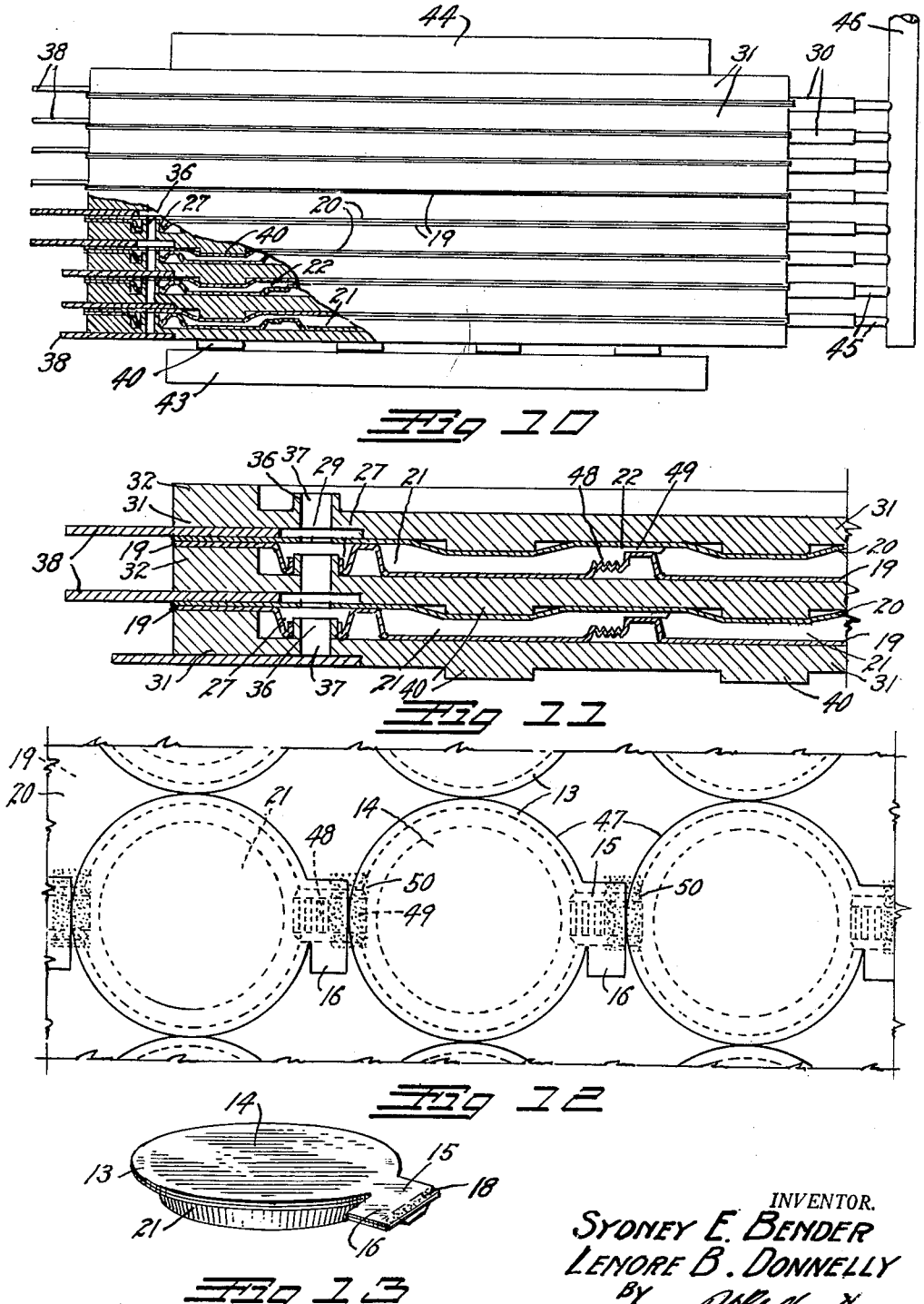
INVENTOR.
SYDNEY E. BENDER
LENORE B. DONNELLY
BY
ATTORNEY

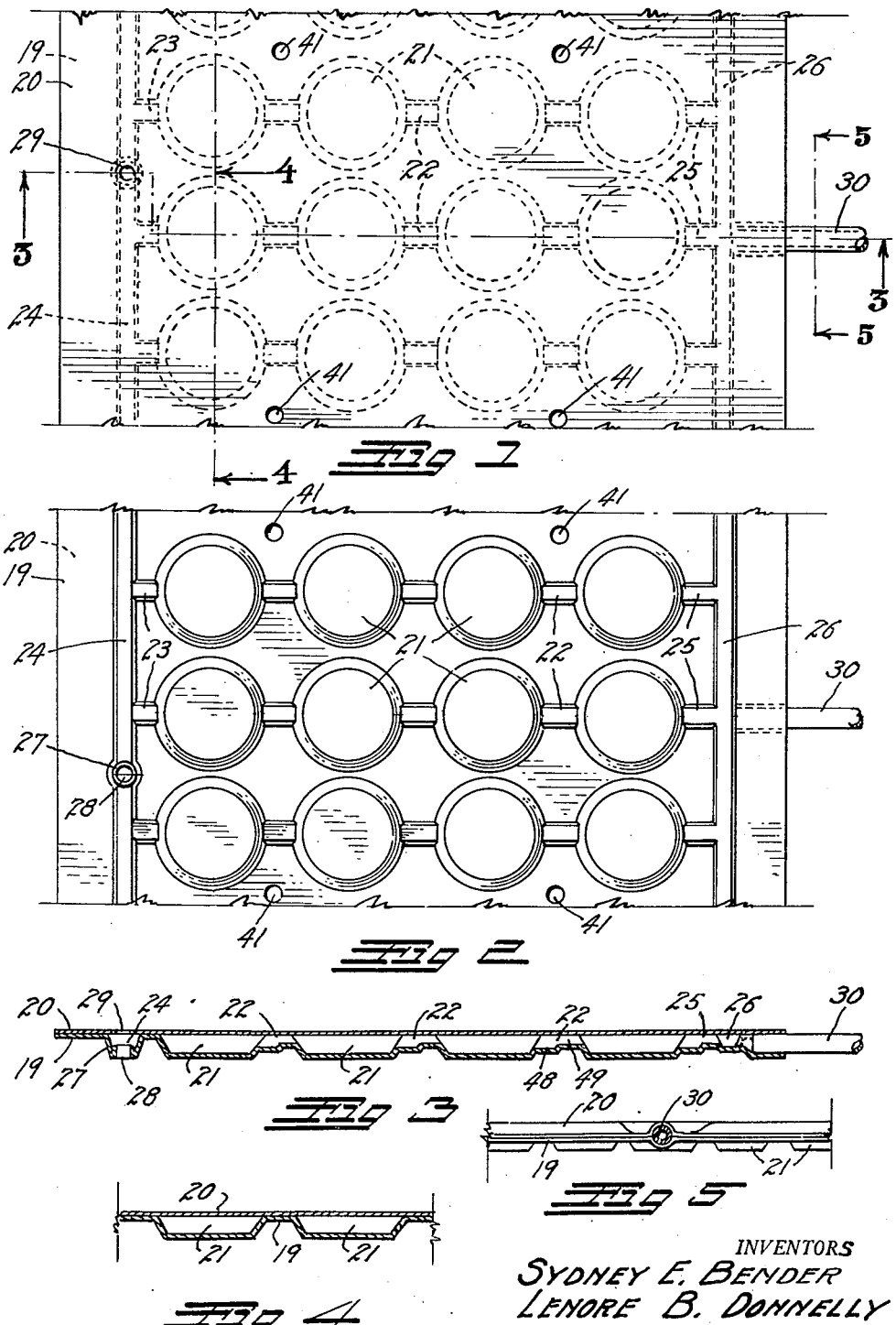

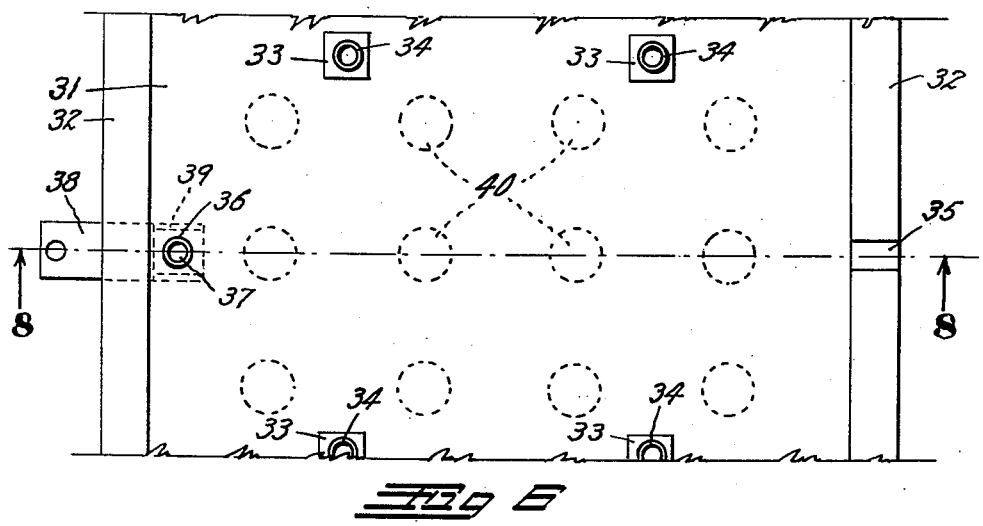
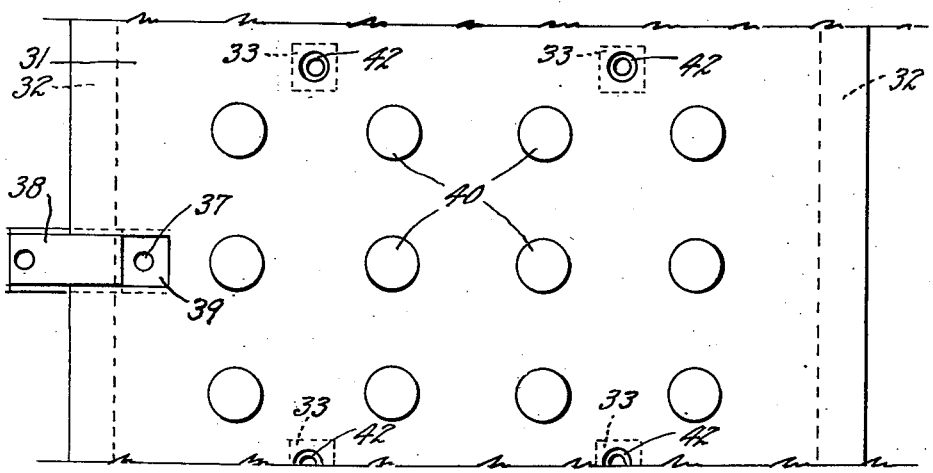
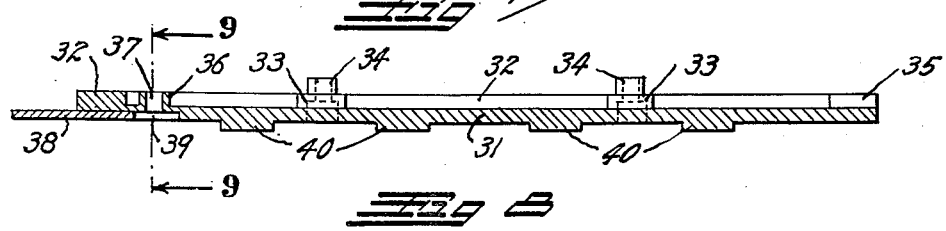
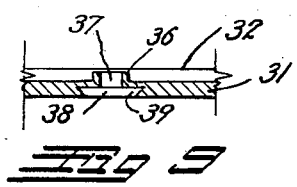

United States Patent Office 2,813,799
Patented Nov. 19, 1957

2,813,799

METHODS AND MEANS FOR MANUFACTURING INDIVIDUAL CONDIMENT DISPENSERS

Sydney E. Bender and Lenore B. Donnelly, Denver, Colo.

Application March 7, 1956, Serial No. 570,022

10 Claims. (Cl. 99—181)

This invention relates to what might be termed an individual condiment container or patty, that is, a small envelope-like enclosure for containing an individual portion of a food accessory such as mustard, ketchup, honey, sirup, etc.

The principal object of the invention is to provide an individual condiment patty by means of which condiments and the like can be safely handled without danger of spoilage, leakage, or damage, and by means of which the contained material will be easily accessible and readily applied to the food of an individual user.

Another object of the invention is to provide a method and means for carrying out a method of manufacturing and filling individual condiment patties by means of which the patties can be rapidly and economically filled with the desired condiment and which will prevent the inclusion of air in the patties; and which will place a predetermined amount of material in each patty and which will prevent rupturing or overfilling of the patties.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of a portion of a cavity sheet employed in the manufacture of the improved individual condiment patty;

Fig. 2 is a bottom view of the portion of the cavity sheet of Fig. 1;

Fig. 3 is a cross-section through the cavity sheet, taken on the line 3—3, Fig. 1;

Fig. 4 is a fragmentary section through the cavity sheet, taken on the line 4—4, Fig. 1;

Fig. 5 is a fragmentary edge view of the cavity sheet, looking on the line 5—5, Fig. 1;

Fig. 6 is a top view of a portion of a spacer plate employed in the manufacture of the improved patty;

Fig. 7 is a bottom view of the portion of the spacer plate of Fig. 6;

Fig. 8 is a cross-section through the spacer plate, taken on the line 8—8, Fig. 6;

Fig. 9 is an enlarged, detail section, taken on the line 9—9, Fig. 7;

Fig. 10 is a side view of a stack of the cavity sheets and spacer plates as employed in the manufacture of the improved patty, partially broken away to show interior construction;

Fig. 11 is a fragmentary enlargement of the broken-away portion of Fig. 10;

Fig. 12 is a similarly enlarged top view of a portion of a filled cavity sheet, showing how the latter is blanked or cut to form the individual patties; and Fig. 13 is a detail perspective view illustrating the improved individual condiment patty as produced by the improved method and means herein described.

In the drawing the sectional portion of Figs. 10 and 11 are taken on the line 3—3, Fig. 1.

The improved individual patty (see Fig. 13) comprises two layers of relatively thin, transparent thermo-plastic material, such as a sheet rubber hydrochloride of the type commercially known as "Pliofilm," or any similar heat sealable thermo-plastic material, welded together around their peripheral edges to form a sealed border flange 13 about a flexible, transparent condiment envelope 14. A dispensing neck 15 protrudes from one side of the envelope, and a tearing flap 16 is formed on one side of the neck 15 to facilitate tearing the latter open to form a dispensing spout. The neck is permanently sealed by means of a transverse weld 18. The lower surface of the neck 15 is preferably provided with transversely extending indentations or corrugations to further facilitate making a transverse tear therein. The user holds the envelope 14 between the thumb and finger of one hand, grips the flap 16 between the thumb and finger of the other hand and tears the flap across the neck 15 to open the latter and provide a spout through which the material can be forced by squeezing the envelope 14.

Since the condiments are dispensed in such exceedingly small amounts, it is essential that a method and means of manufacture be used which will reduce packaging costs to a minimum. Such a method comprises the employment of multiple cavity sheets, such as illustrated in Figs. 1 and 2, formed from a lower layer 19 thermally welded to a top layer 20. The layers 19 and 20 are formed from any suitable sheet thermo-plastic material, such as "Pliofilm," preferably of a thickness of approximately $5/1000$ inch. The layers are preferably, but not necessarily, clear and transparent and are thermally welded together over the entire area of their contacting surfaces. The combined layers will be hereinafter referred to as the cavity sheet 19—20.

The lower layer 19 is formed with a plurality of relatively shallow, circular, taper-edged cavities 21 arranged in columns and rows over the entire area of the layer. The layer may be of any desired size and have any desired number of cavities. In actual practice, layers 12″ x 20″ having thirty-six cavities arranged in four rows of nine cavities each, have been found to be highly satisfactory. The upper layer 20 is a simple flat sheet which covers the cavities to form closed condiment pockets therebetween. In Figs. 1 and 2, the appearance of a portion of the cavity sheet consisting of the two welded layers 19 and 20 is illustrated. The remainder of the cavity sheet is simply a repetition of the portion shown.

Let us assume that the cavities are arranged in four longitudinally extending rows of nine cavities each, in which the cavities of each row are connected transversally by means of connecting passages 22 with the cavities of the adjacent rows. The cavities at one side of the sheet are connected by means of overflow passages 23 to an air channel 24 extending longitudinally of the cavity sheet. The cavities at the other side of the sheet are connected by means of feed passages 25 to a feed channel 26 extending longitudinally of the cavity sheet 19—20. The cavities 21, the passages 22, 23 and 25, and the channels 24 and 26 are all indented into the lower layer 19, and the top sheet 20 forms a sealed cover over all.

A downwardly extending nipple sleeve 27 is formed in the air channel 24. The lower edge of the nipple sleeve 27 is turned upwardly to form a resilient ring about an air port 28, and an air opening 29 is formed in the upper layer 20 over and in alignment with the port 28. There may be as many of the nipple sleeves 27 along the channel 24 as desired. In actual practice, one of these nipple sleeves 27 serves twelve of the cavities 21.

A flexible plastic feed tube 30 extends between the two layers 19 and 20 and is thermally welded or otherwise sealed thereto so as to communicate with the feed channel 26.

The flexible cavity sheets 19—20 are filled with condiments by placing them between relatively stiff plastic spacing plates 31, such as illustrated in Figs. 6, 7 and 8. The spacing plates 31 are formed with a raised flange 32 around their peripheral edges upon which the welded periphery of the cavity sheets is rested. The flange 32 is notched, as shown at 35, for the passage of the feed tube 30. The upper surface of each spacing plate 31 is provided with a plurality of upper spacing blocks 33 corresponding in thickness to the thickness of the peripheral flange 32. A hollow tenon 34 arises from each upper spacing block. The tenons 34 project above the level of the peripheral flange 32. A counterbore 42 is formed through the spacing plate below each spacer block 33. The diameter of the counterbore 42 corresponds to the diameter of the tenon 34.

Each spacing plate 31 is provided with one or more upwardly projecting nipples 36 at the proper positions to align with the nipple sleeves 27 of the cavity sheets 19—20. The nipples 36 terminate below the level of the peripheral flange 32 and each surrounds an air port 37. The air ports 37 may be closed, when desired, by means of slide valves 38 mounted in dovetailed slides 39 in the spacing plate 31.

The lower surface of each spacing plate 31 is provided with a plurality of cavity compressing blocks 40. The blocks 40 are preferably round in shape and are spaced similarly to the spacing of the cavities 21 in the cavity sheet 19—20.

During manufacture, one of the cavity sheets 19—20 is positioned on the upper surface of one of the spacing plates 31 and the nipple sleeves 27 are forced downwardly over the nipples 36, as shown in Fig. 11. The combined sheets are provided with registering openings 41 which fit over the tenons 34. After the first cavity sheet is in place, a second spacing plate 31 is placed thereover, with its counterbores 42 positioned over the upper extremities of the tenons 34 of the first plate.

A second cavity sheet 19—20 is now placed on the second spacing plate 31, similarly to the first cavity sheet, and a third spacing plate 31 is placed on the second sheet, similarly to the second spacing plate. This is continued until a stack of alternating cavity sheets and spacing plates, such as shown in Fig. 10, is attained. The stack is clamped together in any desired manner in any suitable clamping device such as between a base block 43 and a weighted top block 44.

The superimposed feed tubes 30 are connected to outlets 45 on a feed manifold 46. The condiment flows into the feed tubes 30 and the feed channels 26 of all of the cavity sheets, and from thence through the passages 25 and 22 to all of the cavities 21 so as to fill all of the cavities in all of the cavity sheets.

It has been found that the condiment will fill the lowermost cavity sheet first, may then rise through the air port 37 into the next above sheet, resulting in the entrapping of air in the cavities of the second sheet. To prevent this, the lowermost slide valve 38 is closed when the first cavity sheet is completely filled so as to prevent further condiment from entering that sheet. The next above slide valve is then closed when the next above sheet is filled, and this is continued to the top of the pile, thus assuring that every cavity will be completely filled and all will be completely free of air pockets.

As the condiment flows into the cavities, the air therefrom is discharged through the overflow passages 23, the air channel 24, and the air ports 37 in the superimposed nipples 36, to discharge from the uppermost nipple 36.

When all of the cavity sheets have been filled, the stack is disassembled and each sheet is placed beneath a multiple heating element which contacts the sheets at the positions indicated by the dotted areas 50 in Fig. 12 to weld the passages 22, 23 and 25 closed at the indicated areas.

The cavity sheets are then placed beneath a multiple cutting die, the knives of which are arranged to cut the sheets as indicated by the cut lines 47 to simultaneously produce a plurality of the completed patties as illustrated in Fig. 13.

It is preferred to form the passages 22, 23 and 25 with a relatively thick neck portion having a corrugated bottom 48 and with a relatively thin portion 49 which is welded together as above described to form the completed closed neck 15. The neck weld of the restricted portion of the passage is indicated at 18 in Fig. 13.

While a specific form of the improvement has been described and illustrated herein, it is desired to be understood that the same may be varied, within the scope of the appended claims, without departing from the spirit of the invention.

Having thus described the invention, what is claimed and desired to secure by Letters Patent is:

1. A method of making individual condiment patties comprising: forming in a sheet of thermoplastic material a plurality of indented cavities means, said cavities being interconnected by indented necks to constitute an indented lower layer; placing a sheet of thermoplastic material over said indented lower layer to provide an upper layer thereover, thermo-welding the upper sheet to the contacting portions of the lower sheet to provide a multiple cavity assembly; forcing a condiment between said layers so that it will flow from cavity to cavity through said indented necks; welding the upper to the lower sheet at said necks so as to weld said necks closed; thence stamping individual condiment patties from said sheet, each pattie being cut from said sheet by a peripheral shear line, said shear line surrounding a cavity and extending through the welded portions of the neck thereof.

2. A method of making individual condiment patties as described in claim 1 in which a feed passage is indented into the first layer and closed by the second layer and forming connecting passages between said feed passage and said cavities for supplying the condiment thereto.

3. A method of making individual condiment patties as described in claim 2 in which an air channel is indented in the first layer and closed by the second layer, said cavities being connected to said air channel so that air may discharge from said cavities as the condiment enters therein.

4. A method of making individual condiment patties as described in claim 3 in which a plurality of the cavity sheets are positioned between spacing plates in alternating relation before supplying condiment between said sheets.

5. Means for forming individual condiment patties comprising: a first layer of relatively thin, flexible thermoplastic material capable of thermo-sealing; pockets indented in the first layer; narrow elongated connecting passages indented in said first layer and connecting said pockets; a second layer of similar thermo-plastic material thermal-welded over the entire surface of the first layer and acting as a cover for said pockets and passages and forming a complete unitary cavity sheet, said indented pockets being arranged in alignment in a plurality of adjacent rows and having a longitudinally extending feed channel indented adjacent the extremities of said rows, and indented feed passages connecting said feed channel with said pockets, said second layer acting as a cover for said feed channel and said feed passages; means for supplying condiment to said feed channel; and means for allowing air to discharge from the pockets as the condiment flows therein.

6. Means for forming individual condiment patties as described in claim 5 in which the means for allowing the air to discharge comprises a longitudinally extending air channel indented in said first layer and covered by said second layer; and an air port communicating from said air passage through both said layers.

7. Means for forming individual condiment patties as described in claim 6 having a flexible feed tube extending between said layers and being sealed thereto and communicating with said feed channel.

8. Means for forming individual condiment patties as described in claim 7 said sheets being piled in a stack in super-imposed relation for filling purposes.

9. Means for forming individual condiment patties as described in claim 8 having separating plates separating the adjacent sheets in said stack.

10. Means for forming individual condiment patties as described in claim 9 having vertical air passages formed in said spacing plates and communicating with the ports in said sheets to allow the air to flow from sheet to sheet.

References Cited in the file of this patent
UNITED STATES PATENTS

| | | |
|---|---|---|
| 2,633,284 | Moffett et al. | Mar. 31, 1953 |
| 2,674,536 | Fisher | Apr. 6, 1954 |
| 2,713,543 | Peters | July 19, 1955 |
| 2,736,656 | Marshall | Feb. 28, 1956 |